(12) United States Patent
Da Silva Teixeira et al.

(10) Patent No.: US 10,584,898 B2
(45) Date of Patent: Mar. 10, 2020

(54) MODULAR FACADE OR COVERING ELEMENT WITH USE OF SOLAR ENERGY FOR WATER HEATING, AIR CONDITIONING AND VENTILATION

(71) Applicants: T&T MULTIELÉTRICA, LDA, Campia (PT); UNIVERSIDADE DE AVEIRO, Aveiro (PT)

(72) Inventors: Augusto Da Silva Teixeira, Campia (PT); Paulo Jorge Da Silva Teixeira, Campia (PT); Fernando José Neto Da Silva, Coimbra (PT); Rui Pedro De Jesus Teixeira, Aviero (PT); Bruno Daniel Cordeiro Pereira, Aveiro (PT); Mónica Sandra Abrantes De Oliveira Correia, Ilhavo (PT); José Paulo Oliveira Santos, Aveiro (PT); Nelson Amadeu Dias Martins, Palmaz (PT)

(73) Assignees: T&T MULTIELÉTRICA, LDA, Campia (PT); UNIVERSIDADE DE AVEIRO, Aveiro (PT)

( * ) Notice: Subject to any disclaimer, the term of this patent is extended or adjusted under 35 U.S.C. 154(b) by 193 days.

(21) Appl. No.: 15/568,680

(22) PCT Filed: Apr. 21, 2016

(86) PCT No.: PCT/IB2016/052283
§ 371 (c)(1),
(2) Date: Oct. 23, 2017

(87) PCT Pub. No.: WO2016/170504
PCT Pub. Date: Oct. 27, 2016

(65) Prior Publication Data
US 2018/0156495 A1    Jun. 7, 2018

(30) Foreign Application Priority Data

Apr. 21, 2015    (PT) .......................................... 108391

(51) Int. Cl.
*E04D 13/18* (2018.01)
*F24S 10/00* (2018.01)
(Continued)

(52) U.S. Cl.
CPC .............. *F24S 10/00* (2018.05); *F24D 3/005* (2013.01); *F24D 5/005* (2013.01); *F24S 10/30* (2018.05);
(Continued)

(58) Field of Classification Search
CPC ............. F24S 10/00; F24S 10/66; F24S 10/20
(Continued)

(56) References Cited

U.S. PATENT DOCUMENTS 3,919,998 A * 11/1975 Parker ..................... F24S 70/65
126/634
3,964,678 A * 6/1976 O'Hanlon ................. E06B 7/02
126/630
(Continued)

FOREIGN PATENT DOCUMENTS

DE        31 41 931 A1     5/1983
DE        201 06 983 U1    10/2001
(Continued)

*Primary Examiner* — Avinash A Savani
(74) *Attorney, Agent, or Firm* — Leason Ellis LLP

(57) ABSTRACT

A system for heating a work fluid and for air circulation comprises a plurality of collectors fitted top-to-top in one or more columns, such that air ducts of the modules constitute a single duct along a column, wherein the solar collector comprises: one solar radiation planar absorber with one anterior face exposed to solar radiation and another posterior face affixed to the work fluid piping; one duct for exchanging heat with the planar absorber via the air duct which has its air inlet and outlet on opposite tops of the solar collector. The system can additionally comprise a descendent air duct to collect air from the upper part of the building and to
(Continued)

supply air to the lower side of one or more columns of the facade.

20 Claims, 13 Drawing Sheets

(51) Int. Cl.
  *F24D 3/00* (2006.01)
  *F24S 20/66* (2018.01)
  *F24S 10/30* (2018.01)
  *F24D 5/00* (2006.01)
  *F24S 90/00* (2018.01)
  *F24S 10/20* (2018.01)

(52) U.S. Cl.
  CPC ............... *F24S 20/66* (2018.05); *F24S 90/00* (2018.05); *F24S 10/20* (2018.05); *Y02B 10/20* (2013.01); *Y02E 10/44* (2013.01)

(58) Field of Classification Search
  USPC ............... 126/633, 589, 606, 620, 624, 588
  See application file for complete search history.

(56) References Cited

U.S. PATENT DOCUMENTS

| | | | | |
|---|---|---|---|---|
| 3,980,071 | A * | 9/1976 | Barber, Jr. | F24S 80/60 126/606 |
| 4,027,821 | A * | 6/1977 | Hayes | F28D 20/0039 126/588 |
| 4,122,828 | A * | 10/1978 | DiPeri | F28F 9/0263 126/671 |
| 4,204,523 | A * | 5/1980 | Rothe | E04D 13/031 126/623 |
| 4,257,399 | A | 3/1981 | Shonerd | |
| 4,274,396 | A * | 6/1981 | Peters | F24S 20/66 126/663 |
| 4,285,331 | A | 8/1981 | Bloxsom | |
| 4,324,289 | A * | 4/1982 | Lahti | F24D 11/007 165/48.2 |
| 5,575,276 | A * | 11/1996 | Fossum | F24D 17/0021 126/588 |
| 5,894,836 | A * | 4/1999 | Wu | F24F 5/0046 126/617 |
| 2010/0175338 | A1 | 7/2010 | Garcia Cors | |
| 2010/0237028 | A1* | 9/2010 | Cusson | H02S 20/30 211/41.1 |

FOREIGN PATENT DOCUMENTS

| | | |
|---|---|---|
| DE | 101 19 850 A1 | 11/2002 |
| DE | 103 00 427 A1 | 7/2004 |
| EP | 1918661 | 5/2008 |
| EP | 2520870 A1 | 11/2012 |
| JP | S 5847961 A | 3/1983 |
| JP | S 60188756 A | 9/1985 |
| WO | WO 2014197225 A1 | 5/2014 |

* cited by examiner

MODULAR FACADE OR COVERING ELEMENT WITH USE OF SOLAR ENERGY FOR WATER HEATING, AIR CONDITIONING AND VENTILATION

CROSS-REFERENCE TO RELATED APPLICATIONS

This application is a U.S. National Stage Application under 35 U.S.C. § 371 of International Patent Application No. PCT/IB2016/052283, filed Apr. 21, 2016, which claims priority to Portugal Application No. 108391, filed Apr. 21, 2015, which are hereby incorporated by reference in their respective entireties.

TECHNICAL FIELD

The present description fits the technical domain of products related to solar energy absorber appliances for air conditioning, ventilation and water heating in buildings.

BACKGROUND

The document U.S. Pat. No. 4,285,331 A describes an independent module to be installed on a facade for heating air and water. The solar radiation heats up an absorber plate made of stone which in turn exchanges heat with the surrounding air this heated air being directed to the interior of the building enabling the heating of the contiguous division by forced convection. The water heating is produced by an embedded heat exchanger inside the absorber plate. However, the system presented in the document U.S. Pat. No. 4,285,331 A doesn't allow a modular assembly in the form of a facade or a watertight roof, the efficiency of the product is limited because the use of solar radiation is done simultaneously to water and air.

The document U.S. Pat. No. 4,257,399 A presents an air conditioning method that uses a roof integrated system of water channels and two buffer tanks. Using the diurnal temperature variation between peaks and solar irradiation, the system stores or releases heat allowing the air conditioning of the room.

The document EP2520870 B1 presents a product based on a solar thermal absorber for air conditioning, it performs the heating by a thermal gain and insufflation of air in the building, as well as passive cooling by generating negative pressure from thermal effect.

The document US20100175338 A1 presents a module (picture 6 of the aforementioned document) for the heating of a fluid that absorbs heat by being exposed to solar radiation, it can be applied to roofs or facades. However the presented module exposes its heat absorber plate directly to the exterior with it subsequent reduction of efficiency in conditions unfavorable to heating.

The document EP1918661 A1 presents a building element for the heating of air or water to be applied on facades or covers (picture 7 of the aforementioned document) characterized by a poly-carbonate panel that harnesses the solar irradiation to heat a working fluid that flows inside the panel.

GENERAL DESCRIPTION

The current solution presents a high efficiency modular unit, integrated in a building and allowing an efficient use of solar energy and its centralized management in a way to comply with the energy demands of a building in response to different consumption profiles, using for the this passive ventilation principles that render in energy savings. Additionally, the presented system allows that the water in the circuit to be collected in an expansion vessel enabling this way a substantial increase in the equipment performance for air heating and passive ventilation. The described solution comprises a modular facade on which each module is placed on top of the previous without fixing requirements, thus forming a vertical column of modular facades. Each module, however, can be fixed to both previous and next modules horizontally by an assembly system with a protrusion profile up to the insulation height. This fixing method reflects on the clamping and robustness of the structure. The cited profile for horizontal fixing is, particularizing, an omega profile of 90° or 90-100°.

The current solution presents a lower complexity level compared to document U.S. Pat. No. 4,257,399 A while being compatible with traditional ventilation systems, promoting natural convection and being less dependent on pumping systems. The document U.S. Pat. No. 4,257,399 A refers a large scale system that has a complexity that hinders the implementation in new buildings or reconstructions.

The current solution uses operating principles similar to those described on document EP2520870 B1 when it refers to the heating of air (picture no 4 of the aforementioned document) and to the modular concept of the product (picture no 3 of the aforementioned document). It differentiates itself by ensuring the heating of water by opposition to product EP2520870 B1 that enables only the air heating and storage of heat for posterior heating of the contiguous room, with no connection to the building's air-distribution systems, having though an operating principle similar to a Trombe Wall.

The presented solution presents a solar absorber for water heating, thus using conventional materials and technics for its production. However, it offers the additional feature of air conduction and supplying hot air.

The present solution differentiates itself from EP1918661 A1 by presenting additional features as air cooling by passive ventilation and a superior thermal efficiency, less susceptible to climate changes. The system of document EP1918661 A1 has a limited efficiency due to its reduced absorptivity, mainly due to its semitransparent poly-carbonate material, and by its direct exposure to outdoor environment, which restricts its efficiency during days with weather conditions unfavorable to heating.

The present solution appears out of the necessity to combine in one product the utilization of solar energy for air water heating and air conditioning taking part of the phenomena of natural convection in buildings contributing this way to reduce substantially the energy consumption without compromising the indoor thermal comfort.

It is disclosed a facade or cover element, that comprises a set of absorber modules (101), a set of feeding and collection units (102), one or more circulation pump units (201), one or more expansion vessels with possibility to store hot water (205), a set of controlled valves (202 and 204), a set of temperature sensors (T1, T2, T3 and T4), a set of control connections of the circulation pump units and controlled valves, a set of ventilation duct dampers (301 to 316), a set of supply fans (314) and a control connection for fans and air dampers.

The modular facade or cover element is composed by a set of absorber modules (101) grouped accordingly to the buildings' specific demands and construction requirements. The set of modules must be composed by a minimum of two sequential modules allowing the conduction of an air and water flow through the sequential modules. A sequence of modules constitutes an independent column. At the base and top of a column a feeding and collecting module (102) will perform the connection to the buildings air duct system (121) and to the water circuit and its circulation pumps (201), set of solenoid valves (202 and 204) and to the expansion vessel (205).

The control system (203) will read all temperature points and will act through the control connection of the fans (314) and air dampers (301 to 316) and through the control connection of the circulation pumps (201) and controlled valves (202 and 204). The system management will be made accordingly with the building consumption load profile, momentary demands of air renewal, air conditioning and hot water, the quantity of stored energy and instantaneous weather conditions.

The present solution represents a high efficiency modular system, integrated in the building and allows an efficient use of solar energy and a centralized management of the harnessed energy to respond to the building energetic demands in response to the different consumption profiles. Additionally it uses principles of passive ventilation that enable energy savings.

The present solution presents an inferior complexity level, is compatible with conventional ventilation systems and promotes natural convection being this way less dependent on pumping systems.

While the present disclosure makes use of similar operating principles for air conditioning (picture no 4), as well as for a modular concept of the product (picture no 3), it differentiates itself by adding to the product the function for water heating, and also, for being a structural element of the building.

While the present disclosure makes use of similar operating principles for air conditioning, the structural disposition based on the modular concept differentiates itself from the discussed document, as well, it includes a function for water heating.

Although the present disclosure presents a solar collector for water heating, it does not aim to present a resistance of this nature, therefore using conventional materials and construction technics. However, it offers the additional feature of air conditioning, by hot air insufflation, having obtained a thermal gain in direct contact with the radiation absorber associated to the water heating.

Although the present disclosure presents functionality to similar applications, it differentiates itself by providing additional functions like air cooling by passive ventilation, and construction based on metallic materials.

It is described a solar collector for fluid heating and air circulation for modular assembly on a facade, comprising: a planar absorber for solar radiation for heat exchange, comprising a piping of the fluid to be heated, and comprising an anterior face aimed at solar exposure and an posterior face opposed to the first face, wherein the piping of the fluid to be heated is arranged in the posterior face of the planar absorber;
an air duct for heat exchange with the planar absorber, wherein the air duct comprises a posterior face of the planar absorber and is arranged along said face, and wherein the air duct has an inlet and outlet on two opposite tops of the solar collector. An embodiment comprises a thermal insulation layer arranged over the air duct and arranged posteriorly in relation to the collecting air duct.

An embodiment comprises a thermal insulation layer arranged along the side surfaces of the air duct.

In an embodiment, the air duct of the collector is defined by the posterior face of the absorber, by the thermal insulation layer arranged posteriorly to the air duct and by the thermal insulation layer arranged laterally to the air duct.

An embodiment comprises an expansion vessel and a fluid circuit for draining the piping of the fluid to be heated and for collecting the fluid in said expansion vessel.

In an embodiment, the air duct has a section height of 30-250 mm, in particular 50-200 mm, and more particularly 80-150 mm.

It is also described a building facade for fluid heating and circulation of air comprising a plurality of collectors according to any of the previously described embodiments, wherein the collectors are fitted top-to-top in one or more columns, so that the air ducts of the collectors form an air column along each column of collectors.

An embodiment of the facade comprises
an horizontal profile for bottom fixing of the collectors, arranged between the tops of consecutive collectors fitted top-to-top in a column,
wherein said profile supports the bottom face of the collectors and comprises a protrusion that extends until the same depth of the insulation layer arranged posteriorly in relation to the air duct.

An embodiment of the facade comprises:
an horizontal profile for upper fixing of the collectors, arranged between the consecutive collector tops fitted top-to-top in a column,
wherein said profile supports the upper face of the collectors and comprises one or more connection pins to the horizontal profile for bottom fixing of the collectors, in order to allow the air circulation in the vertical direction of the facade.

An embodiment of the facade comprises
Two profiles on a parallel direction to the flanks of the collectors fitted laterally,
on which one of the referred profiles support the inner face of the collectors and the other of the referred profiles supports the upper face of the collectors, on which each profiles comprises a protrusion that extends to the protrusion of the next profile, and on which the protrusions of the profiles are connected among themselves.

In an embodiment, the two profiles are united and opposed to each other in a way to prevent the air flow on the horizontal direction of the facade.

In an embodiment, the horizontal profile for lower fixing, the horizontal profile for bottom fixing, the horizontal profile for upper fixing, and/or the profile in a parallel direction to the flanks of collectors for bottom and upper fixing of the collectors, is an omega section profile with a bending angle of 90°-100°.

In an embodiment, the facade is arranged vertically.

In an embodiment, the facade is arranged in an angle between 10° and 90° in relation to the horizontal plane.

In an embodiment, the facade is self-supporting.

It is also described a system for fluid heating and for cooling and/or air circulation of a dwelling comprising
a damper for outdoor air inlet for the bottom part of a dwelling
the facade according to any of the previous embodiments, with an upper air outlet for the exterior, and a descendent flow air duct with inlet in the upper part for collecting air from the upper part of a dwelling and with an outlet in the bottom part for bottom insufflation in said facade.

It is also described a system for fluid heating and air circulation for cooling and/or air circulation of a dwelling, comprising a facade accordingly to any of the previous embodiments, with an inferior entrance for the fresh air intake and upper exit for air intake placed at the upper part of the dwelling, and a duct for an upward flow of air with an opening on its bottom part for air collection from the lower part of the dwelling and with an opening on its upper part of the duct for the outlet of air to the exterior.

In an embodiment, the inflow of outside air is associated to a geothermal supply. An embodiment of the system comprises a supply fan to force an air flow. In an embodiment, the system comprises an air damper to control the systems air inlet. In an embodiment, the system comprises an air damper to control the air outlet. In an embodiment, the system comprises an air damper to control the air flow inside the system.

In an embodiment, the system comprises a heat exchanger placed at the lower part of the dwelling. In an embodiment, the system comprises a heat exchanger placed in the upper part of the dwelling.

It should be noted that in a collector, the anterior face is the face which is on the same side of the face of a planar absorber intended for solar exposure. In a collector, the posterior face is the face which is on the side of the planar absorber face opposed to the face intended for solar exposure.

In a collector, the tops are the faces intended to be placed upwards or downwards when the collector is being assembled. The flanks are the faces intended to be disposed laterally in the extremes of the horizontal direction during the collector's assembly.

In a facade, the upward flow refers to a flow that goes up along the facade, not being necessarily vertical, and may be leaned, for example in a roof. In a facade, downward flow refers to a flow that goes down along a facade, not being necessarily vertical, and may be leaned, for example in a roof.

Dwelling refers to a closed habitable space, for example a living room, a dwelling or individual office, a residential building or service building, or an industrial space or a space to store products.

BRIEF DESCRIPTION OF THE DRAWINGS

For a better understanding of the present divulgation drawings are annexed, of which, they represent preferential embodiments that, however, do not intent to limit the object of the current description.

FIG. 19—Composition of the solar absorber module wherein:

191 represents the framing or structure of the module;
192 represents the thermal insulation of the captation module;
193 represents the connecting element for the hydraulic circuit.

Figure 20:
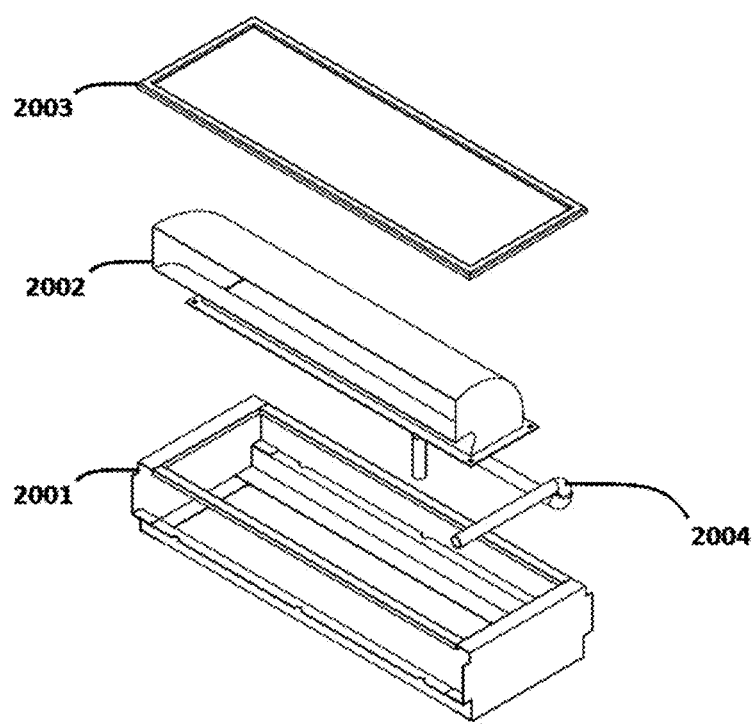

FIG. 20—Composition of the feeding/collecting module wherein:
2001 represents the structure of the connection module;
2002 represents the feeding/collecting duct of the connection module;
2003 represents the closing panel of the connection module;
2004 represents the inlet/outlet of the water circuit.

Figure 21:
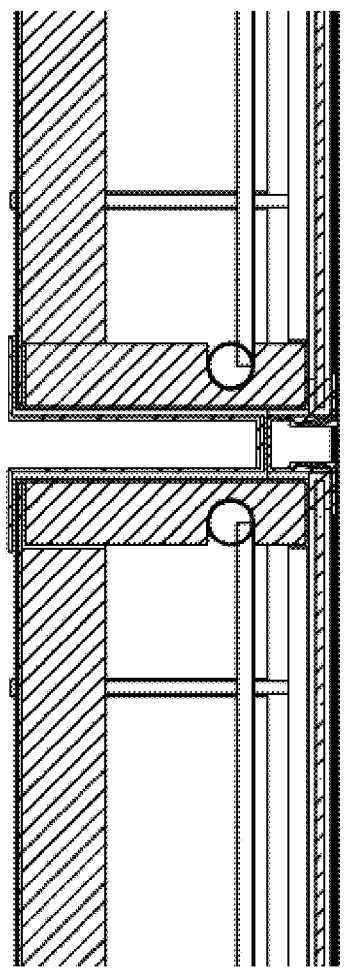

FIG. 21—Detailed section view of the connection system in the union column incorporating the structure of support of the facade.

Figure 22:
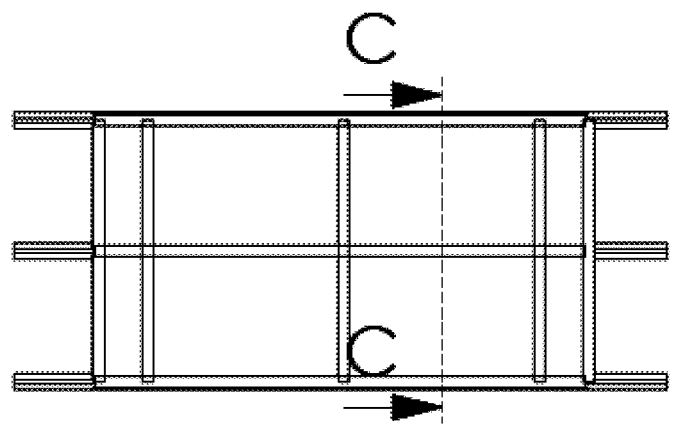

FIG. 22—Cutting plane C-C of a facade with two columns of two collector modules and corresponding connection modules for visualization of the constructive detail of the assembly system in the column union incorporating the structure of support of the facade.

Figure 23:
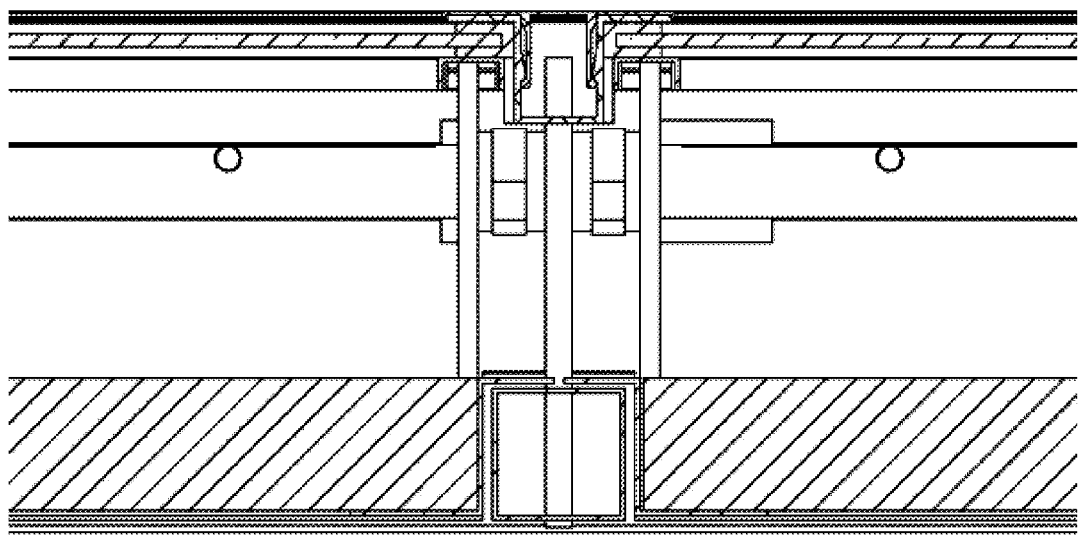

FIG. 23—Detailed cut view of an assembly system in the joining of modules identifying the section for airflow and structural elements.

Figure 24:
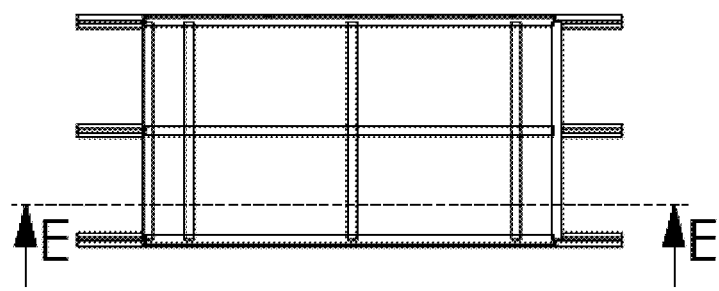

FIG. 24—Cutting plane E-E of a facade with two columns of two absorption modules and corresponding connection modules for visualization of the constructive details of the assembly method in the union of modules with identification of the airflow section and structural elements.

Figure 25:
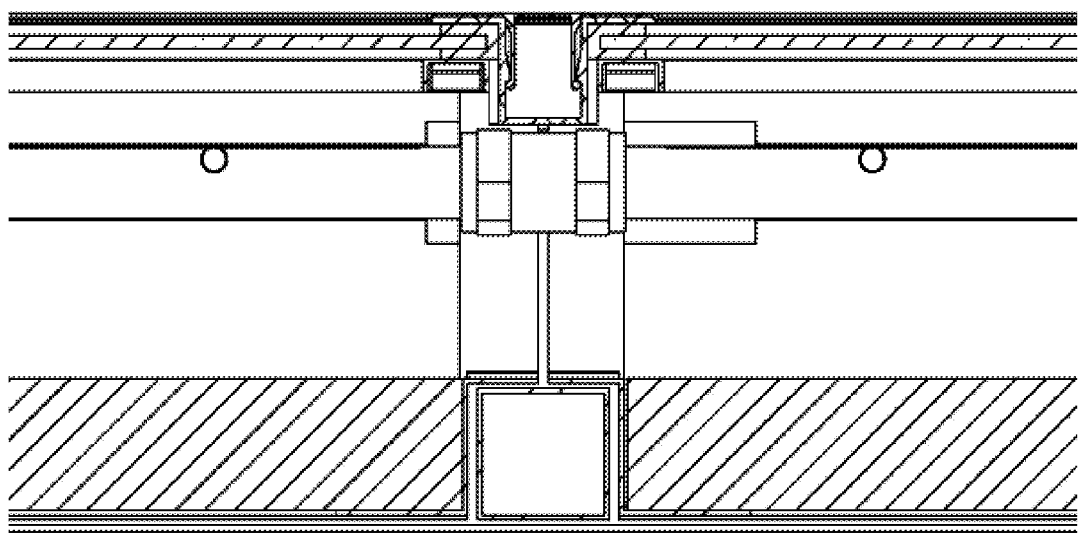

FIG. 25—Detailed cut view of the assembled system in the union of modules identifying the connection system for the water circuit.

Figure 26:
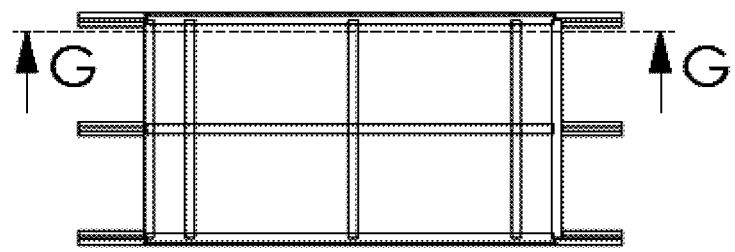

FIG. 26—Cutting plane G-G of a facade with two columns of two absorption modules and corresponding connection modules for visualization of the constructive details of the assembly method on the union of modules with identification of the connection system for the water circuit.

DETAILED DESCRIPTION

Referring the document figures, some embodiments are now described in greater detail, of which are not aimed at restricting the scope of the present disclosure.

The presented disclosure refers to a device that is aimed at heating a fluids and to provide an air flow.

Figure 1:
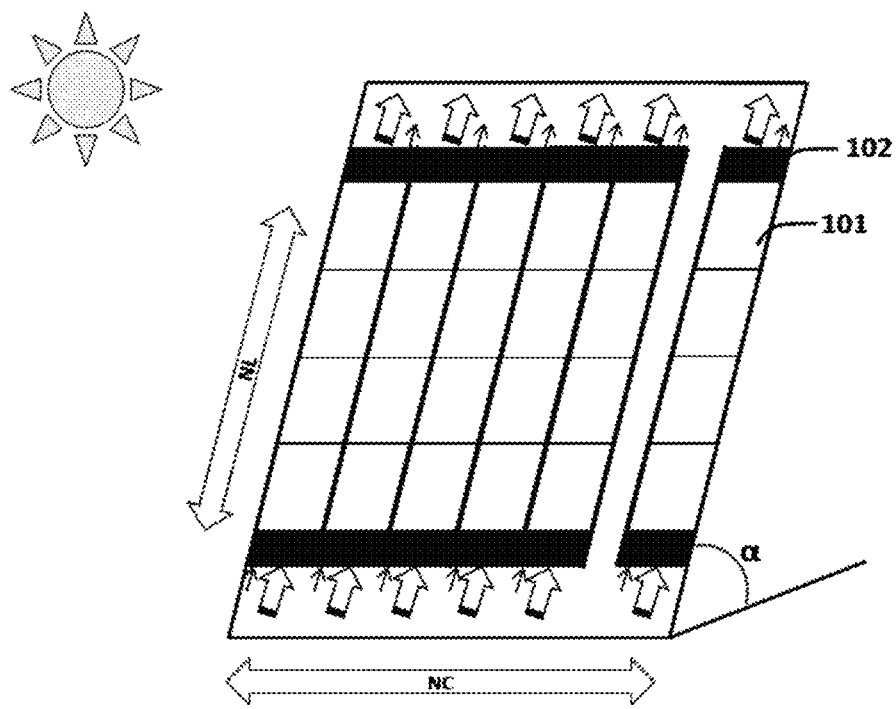
FIG. 1—Scheme for the facade composition or cover elements on which:
  101 represents the captation module;
  102 represents the feeding and collecting modules;
  NC represents the number of columns;
  NL represents the number of rows;
  α represents the angle of the facade or cover element in relation to the base.

The device depicted in FIG. 1 represents a modular facade or a cover element that allows the heating of fluids and of an airflow. This device comprises a set of absorber modules (101) to exchange heat with a fluid circuit to be heated or cooled, for the fluid heating scenario the air duct is placed along the planar absorber face (175) and opposed to sun exposure. The set of planar absorber modules to assemble in a facade can be set accordingly with the building energetic demands and its construction restrictions. The set can vary in the number of columns (NC) and in the number of rows (NL). A set should be composed by a minimum of two sequential modules allowing the conduction of a water flow and airflow through the consecutive modules forming an independent column. At the column base and top it is placed a feeding and retrieval module (102) that establishes connection to the ventilation ducts accordingly to the ventilation mode imposed by the control system (203). The feeding and retrieval modules also secure the connection of every columns water circuit to the main water circuit.

Figure 2:
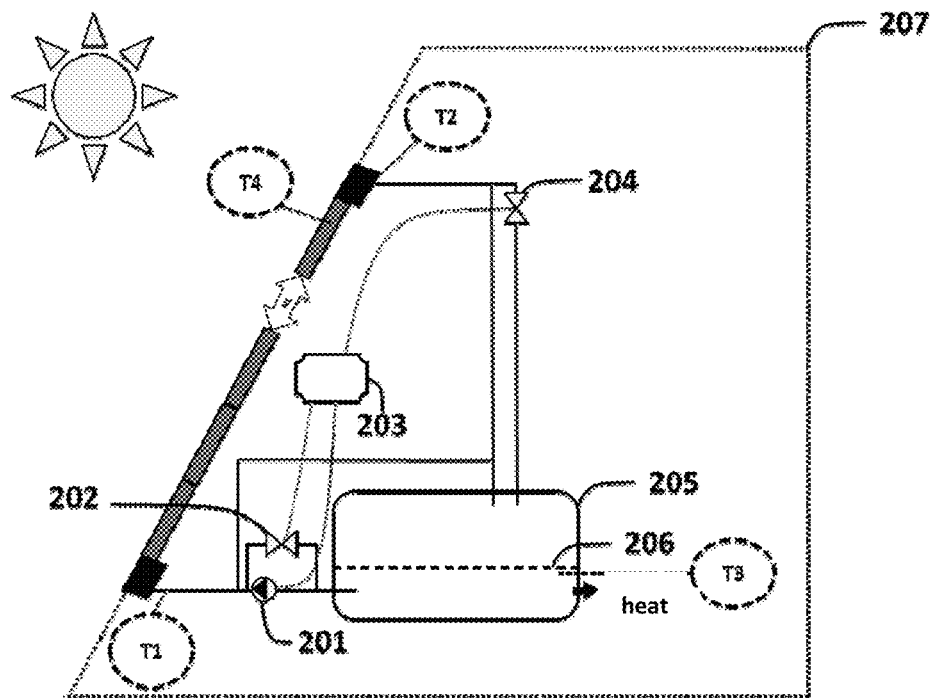
FIG. 2—Water heating circuit on which:
  201 represents a single or several circulation pumps with flow control;
  202 represents a controlled valve;
  203 represents the control system;
  204 represents a controlled valve;
  205 represents an expansion vessel with storage option;
  206 represents the water height line;
  207 represents the building boundaries;
  "Heat" represents the heat flux that supplies the building and is stored in the water circuit;
  T1 represents the temperature sensor placed at the inlet of the facade;
  T2 represents the temperature sensor placed at the outlet of the facade;
  T3 represents the temperature sensor placement applied to the expansion vessel with storage option;
  T4 represents the temperature sensor positioning in the absorber plate;
  The thin and continuous line represents the water circulation circuit;
  The dotted line represents the control connections.

The control system (203) actuates the controlled valves (202 and 204), the variable flow circulation pump (201), the supply fan (314) and the air dampers (301-313) considering the buildings energetic demand profile, the instantaneous demands of air renewal, air conditioning and buildings hot water, quantity of stored energy and the recorded temperature provided by the control points (T1-T4, FIG. 2).

The device depicted in FIG. 2 demonstrates an embodiment of the solution, namely the functional system for the water heating. The depicted system comprises a control system (203) that actuates over a variable flow circulation pump (201) and over the two controlled valves (202 and 204), normally closed. This device creates two different circuits, allowing the filling/load (circuit 1, table 1) and the draining/unload (circuit 2, table 1) of the system in automatic mode. To perform the system filling/load (circuit 1, table 1), the controlled valves (202 and 204) are kept closed and the circulation pump is turned on (201). To perform the system draining/unload (circuit 2, table 1), the circulation pump (201) is turned off and the controlled valves (202 and 204) are opened. This mode allows the draining of the work fluid to the expansion vessel with storage option (205). The control system (203) actuates the variable flow circulation pump (201) to set its flow.

The management of the circulation pump (201) is done by the controller (203) based on an analysis of recorded temperature values provided by the temperature sensors placed at the outlet (T2) of the facade, in the buffer tank (T1), in the storage of the expansion vessel (T3) and in the solar radiation absorber plate (T4). From these values it is calculated the temperature differential $\Delta T$ (T2−T1).

Table 1 summarizes the functioning of the circuit for water heating.

TABLE 1

Functioning of the circuit for water heating

| Circuit | Description | motorized valves status (202 and 204) | Variable flow circulation pump status (201) |
|---|---|---|---|
| 1 | Filling/Load | Both closed | On |
| 2 | Draining/Unload | Both closed | Off |

The filling/load circuit (circuit 1, table 1) allows the heating of the work flow, producing its flow by activating the circulation pump (201) and closing the system valves (202 and 204).

The draining/unload (circuit 2, table 1) enables the draining of the water from the facade, by actuating the motorized valves (202 and 204) and turning off the circulation pump (201).

In FIGS. (3 to 14) descriptions it is used the following symbols: filled black shapes represent closed air dampers. When the supply fan (314) and the heat exchangers (315 and 316) are off they are represented by a filled form and when they are active are represented in white.

Figure 3:
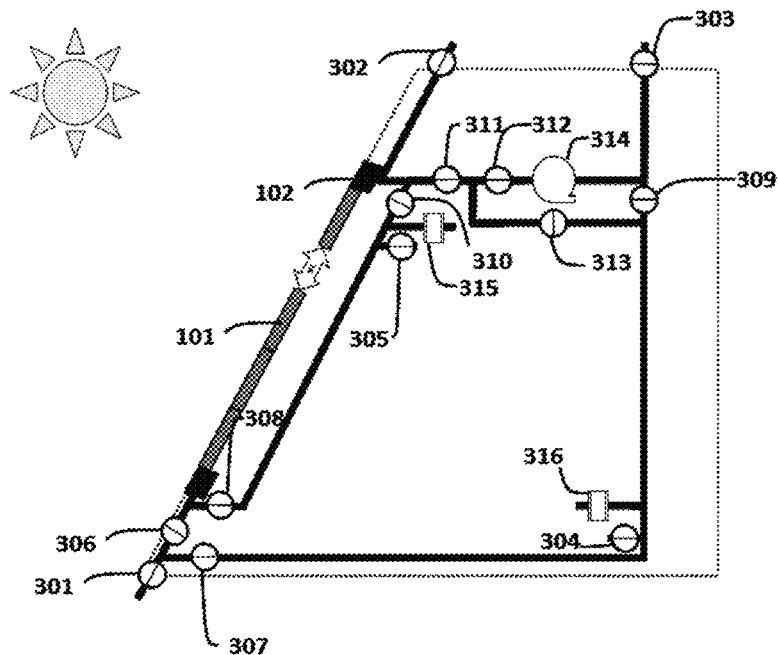
FIG. 3—Diagram of the circuit components for ventilation, air conditioning and air renovation on which:
  301 represents an air damper for fresh outside air intake geothermal source;
  302 and 303 represent air dampers for air outlets;
  304 and 305 represent air dampers that provide access to the air of the building;
  306 to 313 represent air dampers that direct the air flow;
  314 represent the supply fan;
  315 and 316 represent the heat exchangers.

The active air flow circuit is represented by the FIGS. 3 to 16. FIG. 3 corresponds to the components diagram of the ventilation circuit, air conditioning and air renewal. The operating air circuit comprises an outdoor air inlet coming through a geothermal duct (301). The circuit has also two exhaust dampers, one right after the outlet of the facade duct (302) and another after the supply fan (303). It is also depicted two sets of air dampers that give access directly to the interior of the building (304, 305, e 316), one after the supply fan (304) and one before (305). To allow a diversified configuration of supply/return air ducts, it is used air dampers to redirect the air stream (306-313).

Figure 4:
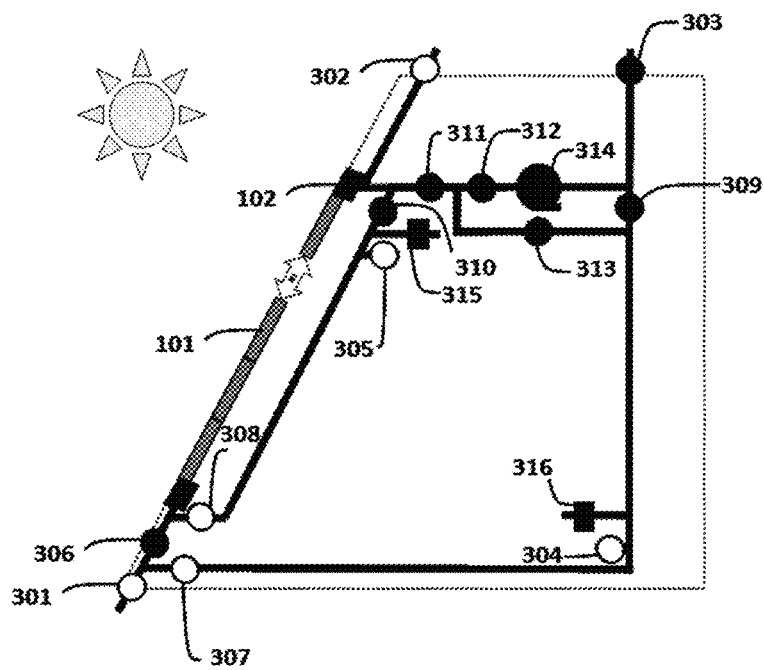
FIG. 4—Cooling circuit with air renovation without mechanical ventilation backup.
Figure 5:
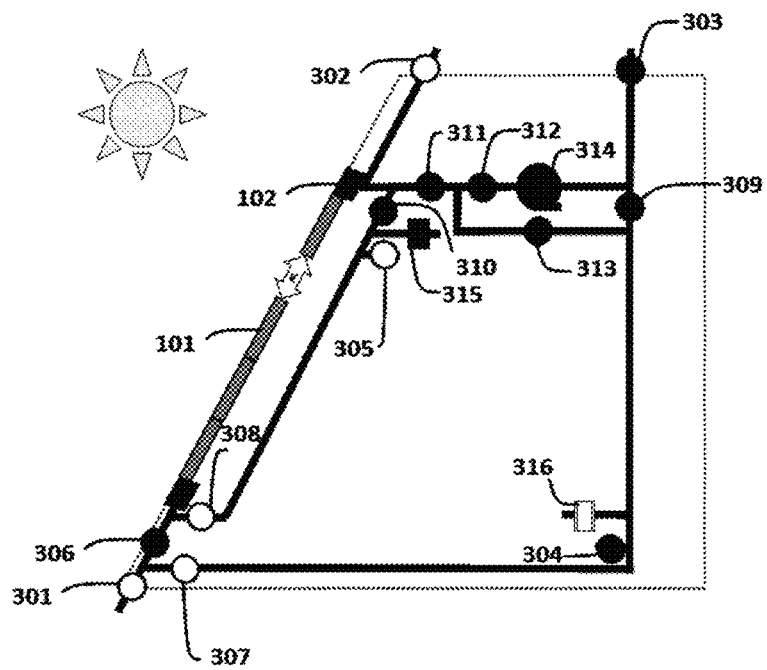
FIG. 5—Cooling circuit with air renovation without the supply fan backup and with an external mechanical ventilation backup.
Figure 6:
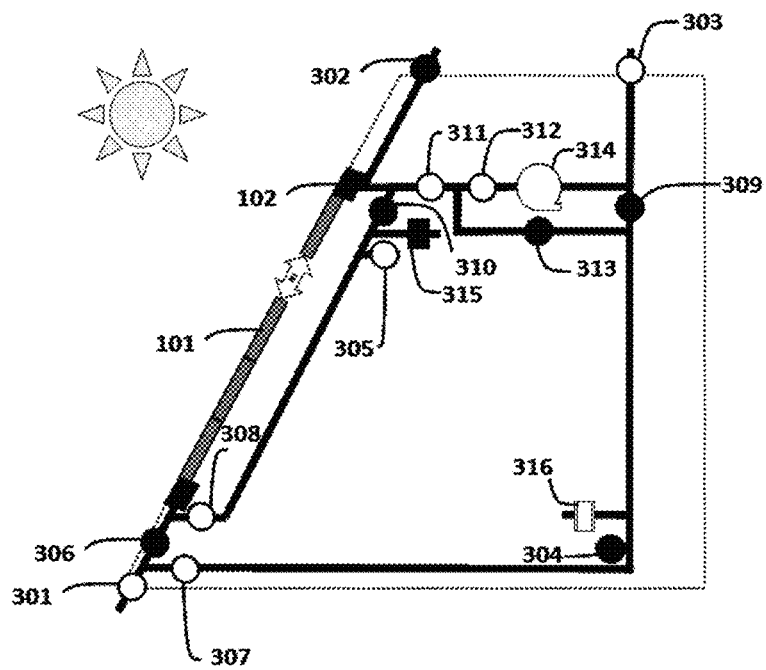
FIG. 6—Cooling circuit with air renovation, supply fan actuated and with an external mechanical ventilation backup.
Figure 7:
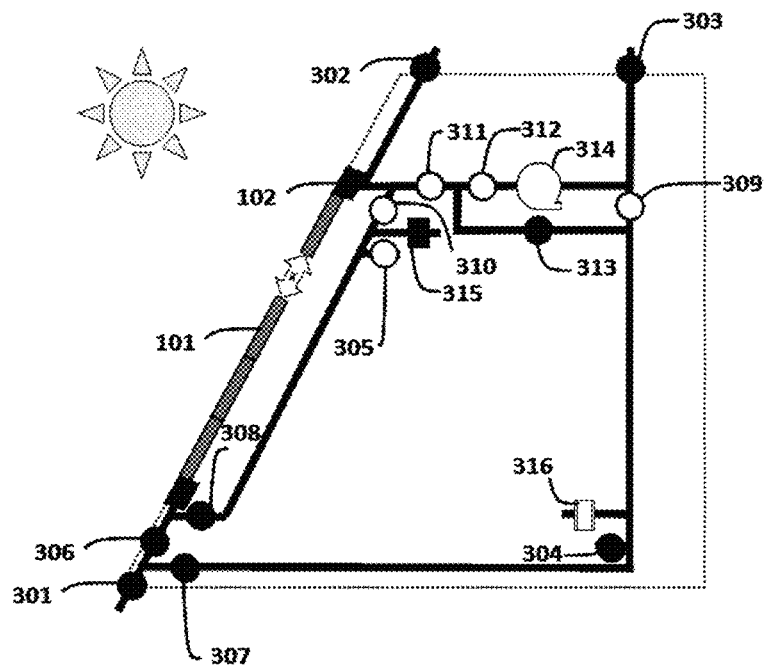
FIG. 7—Cooling circuit without air renovation, supply fan actuated and with an external mechanical ventilation backup.

FIGS. 4 to 6 depict air cooling circuits of the building with air renewal. FIG. 7 depicts an air cooling circuit of the building but without air renewal, in other words, no intake of fresh air from the outside occurs either passive or actively.

Figure 8:
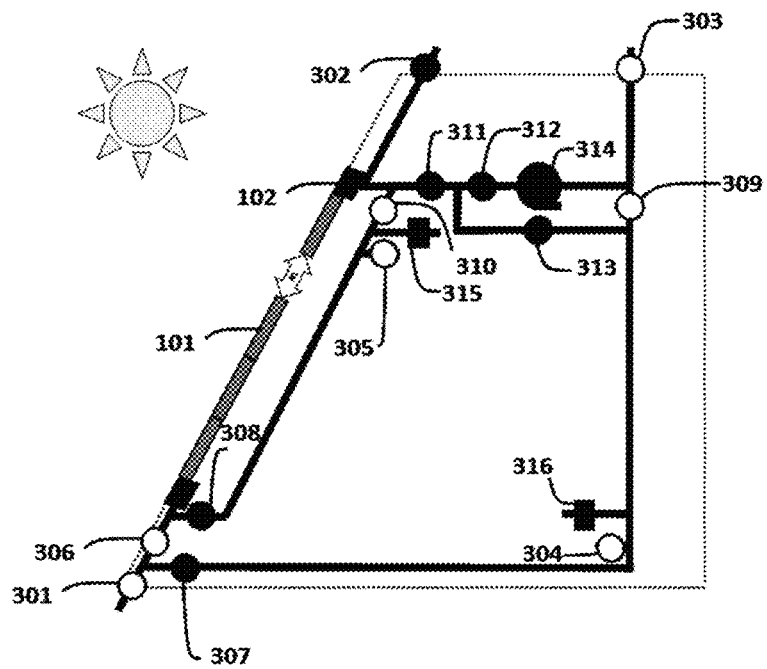
FIG. 8—Heating circuit with air renovation, without supply fan actuated and with no external mechanical ventilation backup.
Figure 9:
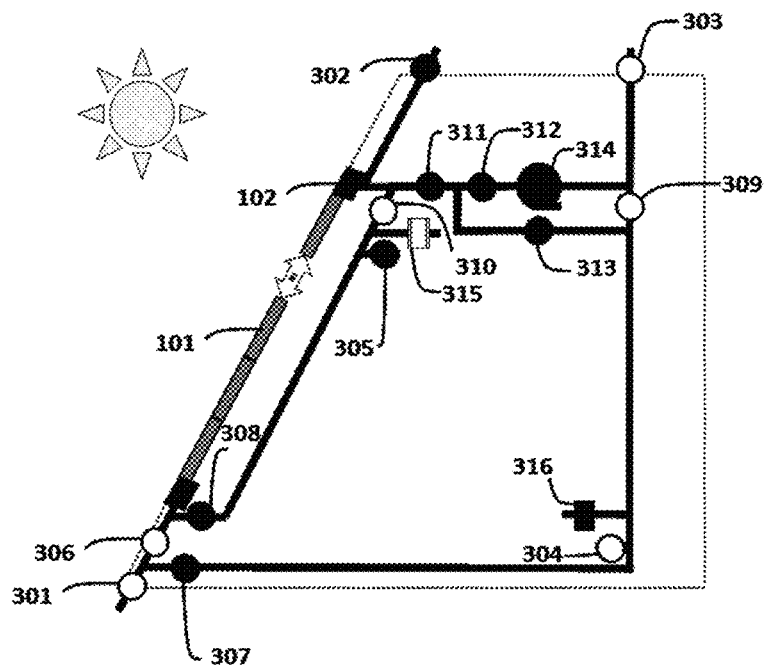
FIG. 9—Heating circuit with air renovation, without supply fan actuated and with external ventilation backup.
Figure 10:
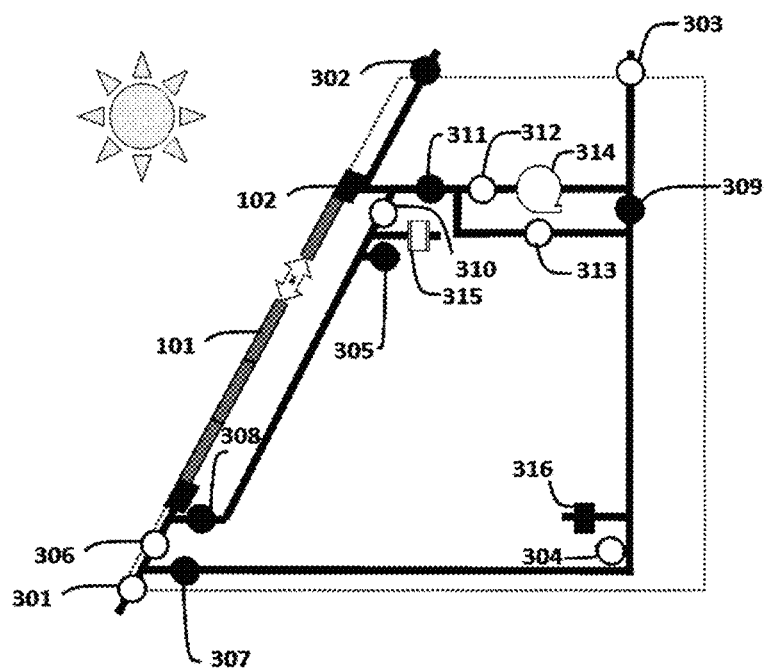
FIG. 10—Heating circuit with air renovation, with supply fan actuated and with an external ventilation backup.

FIGS. 8 to 10 depict circuits set to promote the heating of air of a building with air renewal.

Figure 11:
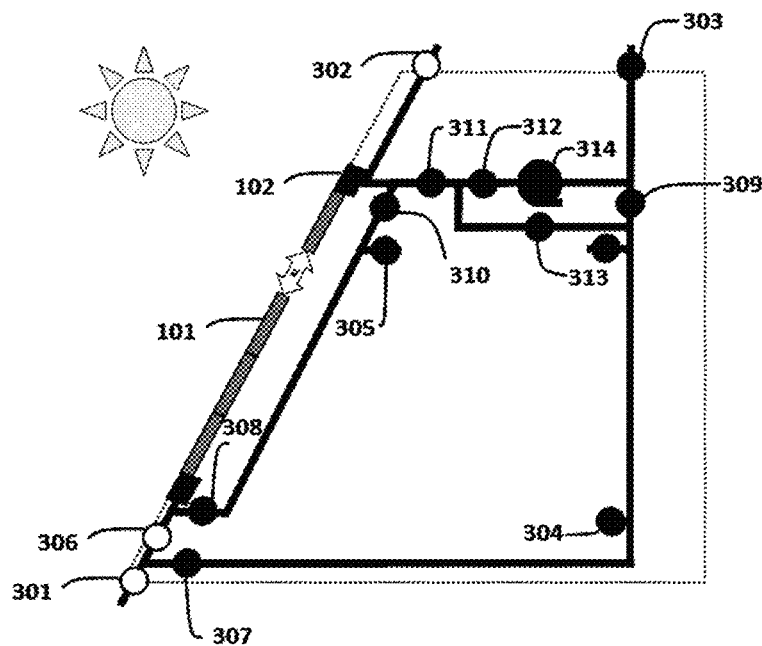
FIG. 11—Security circuit of the absorber plate.

FIG. 11 depicts the safety circuit of the solar radiation absorber plate (circuit 10, table 2) and it allows the cooling of the facade in case of the absorber plate temperature (101) reach excessively high values, for example if the temperature setpoint of 60° C. is reached the facade water circuit is flooded. This value can however be adjusted.

Figure 12:
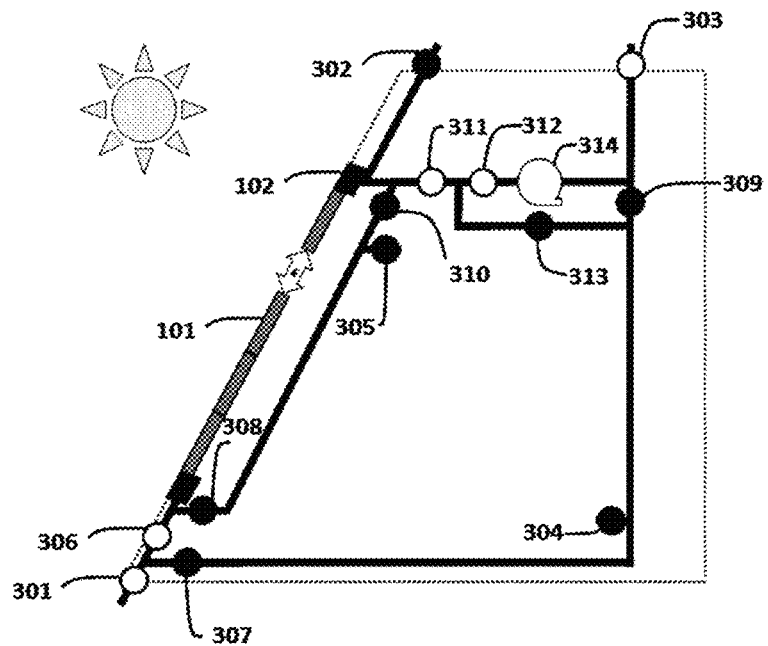
FIG. 12—Security circuit of the absorber plate for the activation of the water circuit.

FIG. 12 depicts the safety circuit of the solar radiation absorber plate for activation of the water circuit (circuit 11, table 2) that allows the cooling of the facade in case of the absorber plate temperature (101) reach higher values than those defined by the installer. For example, if the temperature setpoint of 60° C. is reached in the absorber plate the safety circuit prevents that the system is flooded, forcing a rapid temperature reduction on the absorber plate. This setpoint value can be adjusted.

Figure 13:
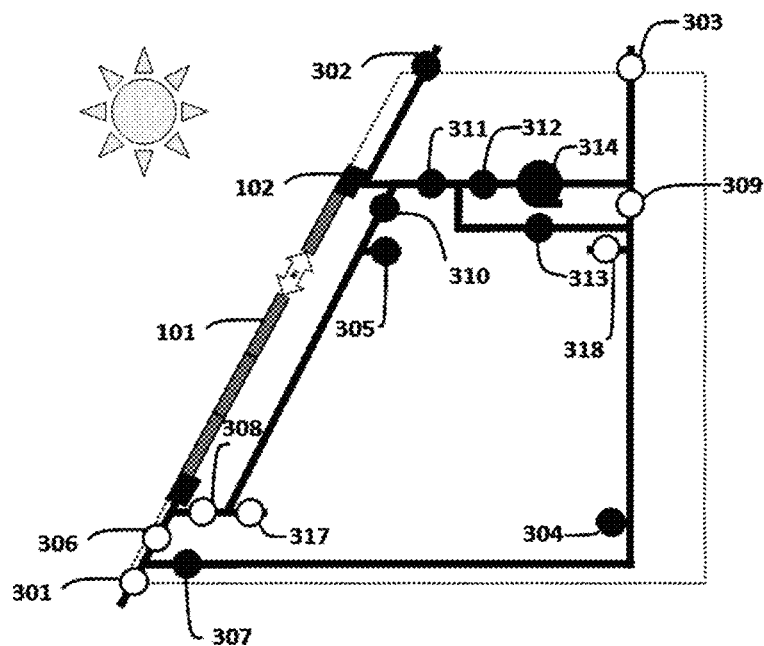
FIG. 13—Passive circuit on which:
  317 and 318 represent air dampers that give access to the air of the building.

The passive circuit, depicted in FIG. 13, allows an airflow inside the building without fan support, particularizing it is opened an inlet for outside air (301) which may or may not be from a geothermal source and it is also opened an outlet after the supply fan (303). Venting is made passively, without resorting to the supply fan (314), and without passing through the facade (circuit 12, table 2).

Figure 14:
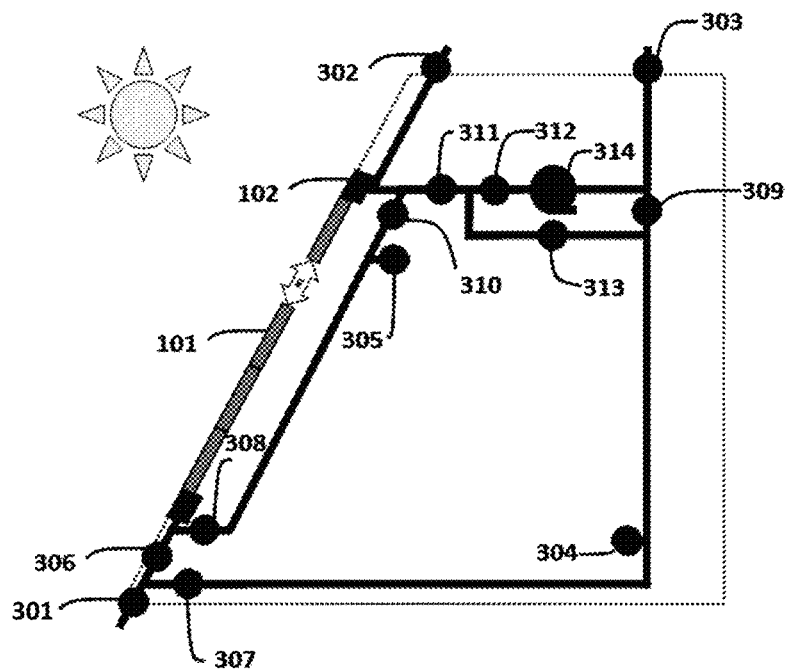
FIG. 14—Closed circuit.

The closed circuit (circuit 13, table 2), depicted in FIG. 14, allows the buildings air circuit to be isolated from the exterior and also the facade. When the facade/s is/are used for the water circuit, and in case the heating/cooling demands of the building are fulfilled, then all valves are closed and the supply fan remains off.

Table 2 summarizes the operating method of the air circuit.

TABLE 2

| Circuit | Description | Air damper status | Air renewal | Supply fan (314) on? | backup ventilation system | FIG. |
|---|---|---|---|---|---|---|
| 3 | Cooling mode - no supply fan, no external backup ventilation system | Opened - 301, 302, 304, 305, 307, 308, All others closed | Yes | No | No | 4 |
| 4 | Cooling mode, no supply fan - with external backup ventilation system | Opened - 301, 302, 305, 307, 308, All others closed | Yes | No | Yes | 5 |
| 5 | Cooling mode - with supply fan, with external backup ventilation system | Opened - 301, 303, 305, 307, 308, 311, 312, All others closed | Yes | Yes | Yes | 6 |
| 6 | Cooling mode - with supply fan, with external backup ventilation system | Opened - 305, 309, 310, 311, 312, All others closed | No | Yes | Yes | 7 |
| 7 | Heating mode - no supply fan, no external backup ventilation system | Opened - 301, 303, 304, 305, 306, 309, 310, All others closed | Yes | No | No | 8 |
| 8 | Heating mode - no supply fan, with external backup ventilation system | Opened - 301, 303, 304, 306, 309, 310, All others closed | Yes | No | Yes | 9 |
| 9 | Heating mode - with supply fan, with external backup ventilation system | Opened - 301, 303, 304, 306, 310, 312, 313, All others closed | Yes | Yes | Yes | 10 |
| 10 | Safety circuit for absorber plate | Opened - 301, 302, 306, All others closed | No | No | No | 11 |
| 11 | Safety circuit for absorber plate with activation of the water circuit | Opened - 301, 303, 306, 311, 312, All others closed | No | Yes | Yes | 12 |
| 12 | Passive circuit | Opened - 301, 303, 306, 308, 309, 313, 317, 318, All others closed | Yes | No | No | 13 |
| 13 | Closed circuit | All opened | No | No | No | 14 |

Figure 15:
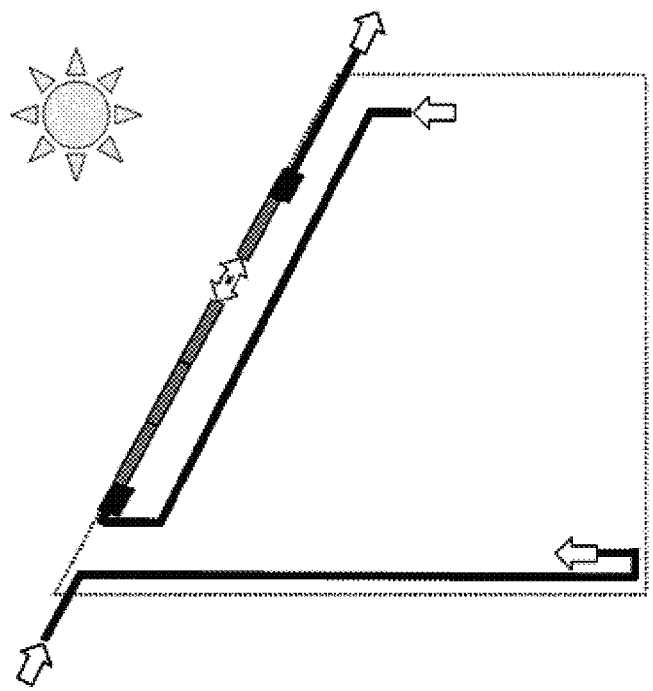
FIG. 15—Simplified cooling scheme on which the arrows represent the direction of the air flow.

FIG. 15 depicts a preferred embodiment of this disclosed disclosure for the cooling of a building/dwelling. In this embodiment, the outside air enters the building/dwelling through an air damper, which can be associated to a geothermal source, and is directed to the bottom of the building/dwelling. The inlet of air in the dwelling occurs because the air in the higher part of the building is removed by an air outlet positioned there. The exhausted air runs through a descendent air duct, feeding the lower end of the facade, the air flows along the planar absorber and is thus exhausted from the building/dwelling through an air damper directed outside. The planar absorber facade works as a siphon that sucks the air from the building/dwelling.

Figure 16:
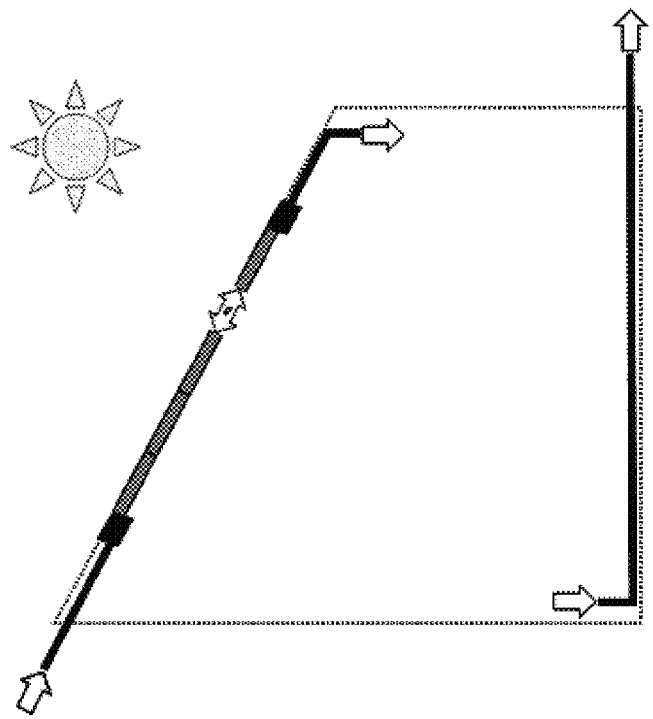
FIG. 16—Simplified heating scheme on which the arrows represent the direction of the air flow.

FIG. 16 depicts a preferred embodiment of this disclosed solution for heating a building/dwelling. In this embodiment, we have an outside air damper that goes directly to the solar collector facade. This air route enables an exchange of heat with the planar solar absorber, the consequence is the heating of air and its natural convection to the top of the facade and is directed to the buildings/dwellings upper rooms. The building/dwelling cold air is, on its turn, removed by a return air duct or a vertical air duct that removes the air from the bottom of the building/dwelling.

Figure 17:
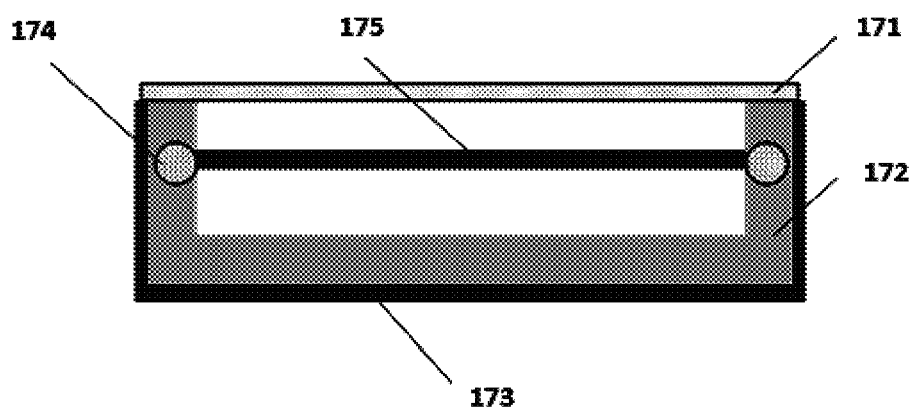
FIG. 17—Construction scheme of the absorber module wherein:
  171 represents the translucent, transparent or opaque exterior panel;
  172 represents the thermal insulation of the module;
  173 represents the body of the module;
  174 represents the inlet and outlet of water;
  175 represents the planar solar radiation absorber plate.
Figure 18:
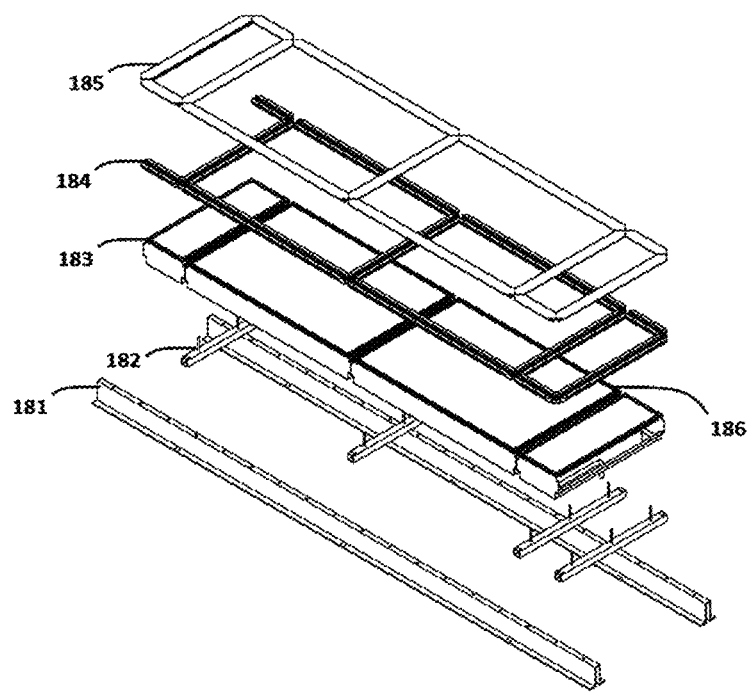
FIG. 18—Construction scheme of the facade wherein:
  181 represents the support column of the facade;
  182 represents the beam of support of the facade;
  183 represents the connection module;
  184 represents the external fixture profile;
  185 represents the exterior closure profile;
  186 represents the captation module.
Figure 19:
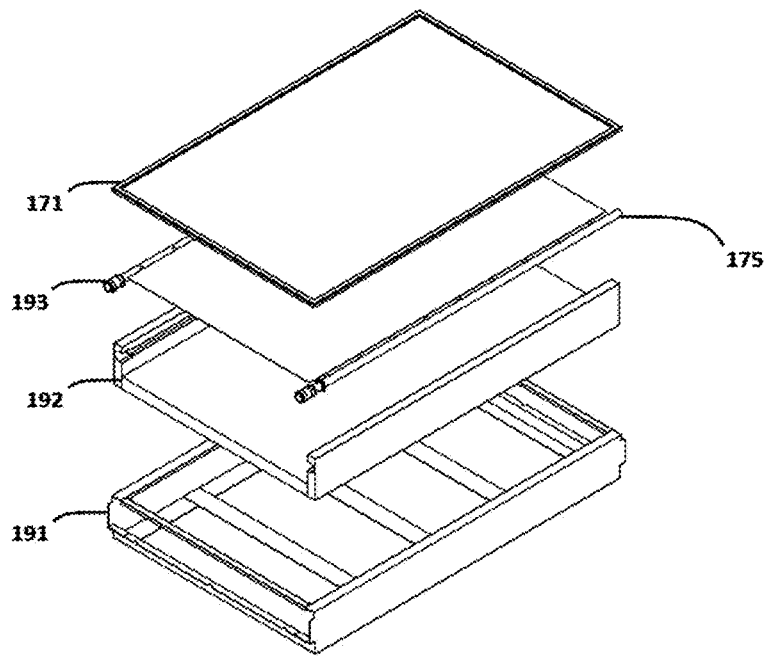

FIG. 17 depicts a preferred embodiment of the current solution, in particular it displays a construction scheme of the absorber module where it is established that the air duct is set along the planar face of the solar absorber opposite to sun exposure, airflow occurs between the absorber plate (175) and the thermal insulation (172). The distance between them (solar absorber and thermal insulation) can vary between 30-250 mm depending on the set up type, namely due to the facade tilt and the magnitude of the air stream. The air duct sizing and the flow of air through the opposition of corrugation of the duct wall are important to obtain a turbulent air regime thus maximizing the heat transfer ratio.

In an embodiment, a module is fixed horizontally to the next module using two omega profiles of 90° or from 90° to 100° and opposing each other in a way not to prevent the air from flowing.

The current description is not, naturally, in any way restricted to the previously described embodiments presented in this document and a person with reasonable knowledge in this area will foresee many change possibilities of the invention without stepping apart from the general idea, just as defined in the claims. The embodiments described above can be complementary or interchangeable between them. The following claims define additionally preferential embodiments.

The invention claimed is:

1. A system for fluid heating and air circulation, comprising:
   a plurality of collectors fitted top-to-top in one or more columns, wherein air ducts of the collectors form an air column along each column of collectors,
   wherein at least one of the collectors comprises:
      a solar radiation planar absorber for heat exchange, comprising a piping of the fluid to be heated, and comprising an anterior face aimed at solar exposure and a posterior face opposed to the first face, wherein the piping of the fluid to be heated is arranged in the posterior face of the planar absorber; and
      an air duct for heat exchange with the planar absorber, wherein the air duct comprises a posterior face of the planar absorber and is arranged along said face, and wherein the air duct has an inlet and outlet on two opposite tops of the solar collector; and
   a descendent air duct with an opening in an upper part thereof for collecting air from the upper part of a dwelling and having an opening in a bottom part thereof for bottom insufflation in the air duct of the one or more collector columns.

2. The system according to claim 1, wherein at least one of the collectors comprises a thermal insulation layer arranged along the air duct and arranged posteriorly in relation to the descendent air duct with an opening in an upper part thereof for collecting air from the upper part of a dwelling.

3. A system according to claim 1, wherein at least one of the collectors comprises a thermal insulation layer arranged along the side surfaces of the air duct of the collector.

4. The system according to claim 1, wherein the air duct of the collector is defined by the posterior face of the planar absorber, by the thermal insulation layer arranged posteriorly to the air duct and by the thermal insulation layer arranged laterally to the air duct.

5. The system according to claim 1, further comprising an expansion vessel and a fluid circuit for draining the piping of the fluid to be heated and for collecting the fluid in said expansion vessel.

6. The system according to claim 1, wherein the collectors are top-to-top column fitted by male-female fittings.

7. The system according to any claim 1, wherein the planar absorber is selected from the group of: copper, aluminum, and copper with a titanium based coating, and aluminum with a titanium based coating.

8. A facade, comprising:
   a plurality of collectors fitted top-to-top in one or more columns, wherein air ducts of the collectors form an air column along each column of collectors,
   wherein at least one of the collectors comprises:
      a solar radiation planar absorber for heat exchange, comprising a piping of the fluid to be heated, and comprising an anterior face aimed at solar exposure and a posterior face opposed to the first face, wherein the piping of the fluid to be heated is arranged in the posterior face of the planar absorber; and
      an air duct for heat exchange with the planar absorber, wherein the air duct comprises a posterior face of the planar absorber and is arranged along said face, and wherein the air duct has an inlet and an outlet on two opposite tops of the solar collector;
   a horizontal profile for bottom fixing of the collectors, arranged between the tops of consecutive collectors fitted top-to-top in a column,
   wherein said profile supports the bottom face of the collectors and comprises a protrusion that extends until the same depth of the insulation layer arranged posteriorly in relation to the air duct; and
   a descendent air duct with an opening in an upper part thereof for collecting air from the upper part of a dwelling and having an opening in a bottom part thereof for bottom insufflation in the air duct of the one or more collector columns.

9. A facade, comprising:
   a plurality of collectors fitted top-to-top in one or more columns, wherein air ducts of the collectors form an air column along each column of collectors,
   wherein at least one of the collectors comprises:
      a solar radiation planar absorber for heat exchange, comprising a piping of the fluid to be heated, and comprising an anterior face aimed at solar exposure and a posterior face opposed to the first face, wherein the piping of the fluid to be heated is arranged in the posterior face of the planar absorber; and
      an air duct for heat exchange with the planar absorber, wherein the air duct comprises a posterior face of the planar absorber and is arranged along said face, and wherein the air duct has an inlet and an outlet on two opposite tops of the solar collector;
   a horizontal profile for upper fixing of the collectors, arranged between the consecutive collector tops fitted top-to-top in a column,
   wherein said profile supports the upper face of the collectors and comprises one or more connection pins to the horizontal profile for bottom fixing of the collectors, in order to allow air circulation along the vertical direction of the facade; and
   a descendent air duct with an opening in an upper part thereof for collecting air from the upper part of a dwelling and having an opening in a bottom part thereof for bottom insufflation in the air duct of the one or more collector columns.

10. The facade according to claim 8, comprising a profile in a direction parallel to the collector flanks for bottom fixing of the collectors, the profile being arranged between the collector flanks fitted laterally, wherein said profile supports the bottom face of the collectors, and wherein the profile comprises a central and longitudinal protrusion.

11. The facade according to claim 8, wherein the central and longitudinal protrusion extends in order to prevent air circulation in the horizontal direction of the facade.

12. The facade according to claim 8, wherein the horizontal profile for bottom fixing, the horizontal profile for upper fixing, and/or the profile in a parallel direction to the flanks of the collectors for bottom and upper fixing of the collectors, is an omega section profile with a bending angle of 90°-100°.

13. The facade according to claim 8, wherein the facade is arranged vertically.

14. The facade according to claim 8, wherein the facade is arranged in an angle between 10° and 90° in relation to a horizontal plane.

15. The facade according to claim 8, wherein the facade is self-supporting.

16. The facade accordingly to claim 8, comprising:

a bottom inlet for an outside air inlet and an upper outlet for insufflation in the upper part of a dwelling having the facade, and an ascending flow air duct with an opening in the bottom part for collecting air from the bottom part of the dwelling and with an opening in the upper of the duct for its exhaustion to the exterior.

17. The facade according to claim 16, wherein the inlet of outside air is associated with a geothermal source.

18. The facade according to claim 8, further comprising a damper for controlling air circulation.

19. The facade according to claim 16, further comprising an air heat exchanger, for placing in the bottom part of the dwelling.

20. The facade according to claim 16, further comprising an air heat exchanger, for placing in the upper part of the dwelling.

* * * * *